(12) United States Patent
Magde et al.

(10) Patent No.: US 7,400,788 B2
(45) Date of Patent: Jul. 15, 2008

(54) LINEARIZED OPTICAL MODULATOR HAVING A PLURALITY OF COUPLING FUNCTIONS

(75) Inventors: Kevin M. Magde, Skaneateles, NY (US); George A. Brost, Lee Center, NY (US)

(73) Assignee: The United States of America as represented by the Secretary of Air Force, Washington, DC (US)

( * ) Notice: Subject to any disclaimer, the term of this patent is extended or adjusted under 35 U.S.C. 154(b) by 532 days.

(21) Appl. No.: 11/183,109

(22) Filed: Jul. 15, 2005

(65) Prior Publication Data

US 2007/0014503 A1    Jan. 18, 2007

(51) Int. Cl.
*G02F 1/295* (2006.01)
*G02F 1/01* (2006.01)
*G02F 1/035* (2006.01)

(52) U.S. Cl. .................. 385/8; 385/1; 385/2; 385/3; 385/4; 385/9; 385/15; 385/31; 385/39; 385/40; 385/41; 385/42; 385/48; 385/50

(58) Field of Classification Search ............ 385/4, 385/8, 9
See application file for complete search history.

(56) References Cited

U.S. PATENT DOCUMENTS

| | | | | |
|---|---|---|---|---|
| 4,198,116 A | * | 4/1980 | Papuchon | 385/9 |
| 4,970,713 A | * | 11/1990 | Imoto | 385/24 |
| 5,056,883 A | * | 10/1991 | Diemeer et al. | 385/8 |
| 5,091,983 A | * | 2/1992 | Lukosz | 385/13 |
| 5,181,262 A | * | 1/1993 | Gerardus et al. | 385/16 |
| 5,502,781 A | * | 3/1996 | Li et al. | 385/4 |
| 5,566,263 A | * | 10/1996 | Smith et al. | 385/40 |
| 5,757,986 A | * | 5/1998 | Crampton et al. | 385/2 |
| 5,778,112 A | * | 7/1998 | Hwang et al. | 385/2 |
| 5,886,807 A | * | 3/1999 | Cummings | 359/263 |
| 6,470,125 B1 | * | 10/2002 | Nashimoto et al. | 385/122 |
| 6,782,166 B1 | * | 8/2004 | Grote et al. | 385/40 |
| 2003/0025986 A1 | * | 2/2003 | Ionov | 359/315 |

* cited by examiner

*Primary Examiner*—Frank G Font
*Assistant Examiner*—Ryan Lepisto
(74) *Attorney, Agent, or Firm*—Joseph A. Mancini

(57) ABSTRACT

Invention discloses an apparatus that provides linear optical modulation of light carrier signals by an electrical modulation signal. Linearized modulation is achieved through the selection of a spacing profile between two optical transmission waveguides. The spacing profile relates to a transfer function, the parameters of which are chosen to yield linear modulation within a particular dynamic range. A preferred embodiment discloses the invention being fabricated within a monolithic structure.

15 Claims, 2 Drawing Sheets

LINEARIZED OPTICAL MODULATOR HAVING A PLURALITY OF COUPLING FUNCTIONS

STATEMENT OF GOVERNMENT INTEREST

The invention described herein may be manufactured and used by or for the Government of the United States for governmental purposes without the payment of any royalty thereon.

BACKGROUND OF THE INVENTION

It is recognized that the use of fiber optics to transfer information bearing signals offers advantages over electrical transmission lines or metallic waveguides, principally due to the wide bandwidth and low loss of fiber optics. The signals of interest are electrical, and must be impressed upon a lightwave carrier before injection into a fiber optic waveguide. A detector at the destination of the fiber optic converts the optical signal back to electrical domain. The hardware that converts the electrical signal to the optical domain and then back to the electrical domain comprises, along with the fiber optic waveguide, an optical link. The performance of the link is affected by each of its components: the laser light source, the device that converts from the electrical to optical domain (which may be the laser itself), and the detector. The accuracy with which the signal is impressed upon the lightwave carrier has an impact on the performance of the optical link and is related to the linearity of the link.

Optical links are engineered to be linear for a specified range of input amplitudes (or power) and resulting output amplitudes (or power). This range constitutes the dynamic range of the system (either input or output). Factors that affect dynamic range include the laser power, the noise of the system, the linearity of the method for converting an electrical signal to the optical domain and the linearity of the detector. Methods of impressing an electrical signal onto the light carrier included either direct modulation of the laser or using an external modulator. Direct modulation of a laser is limited to bandwidths of around 1 GHz. Higher modulation frequencies require external modulators.

Methods of external modulation have been demonstrated in the prior art employing electro-absorption modulators (EAM), Mach-Zender modulators (MZM), and directional couplers (DC). An EAM can be modulated at high speeds, however its large optical attenuation and sensitivity to environmental factors (temperature) have limited its use. The MZM is very successful commercially. The transfer function of the MZM is a cosine function, and input signals are limited to a small part of the transfer function in order to form a linear analog link. The DC modulator is formed by placing two waveguides of an electro-optic material close together and applying an electrical signal to alter the coupling between the waveguides in accordance with the applied signal. The transfer function is a sin(x)/x function. Improvements to the linearity of the MZM or DC transfer function comprise the field of linearization. MZM still lacks sufficient dynamic range.

Linearity is described in the following fashion. The input signal can be represented by a sum a sinusoidal signals of some specific frequency, amplitude and phase. For each individual frequency input to the link, a perfectly linear system would produce only that frequency at the output (with altered amplitude and phase). No present method of converting an electrical signal to the optical domain is perfectly linear, and the non-linearity presents itself as frequencies in the output other that which was input. A single frequency at the input yields many frequencies in the output. The additional frequencies present in the output that were not in the input are the source of a distorted (i.e., nonlinear) output signal.

Engineering solutions allow linear optical links to be created from nonlinear components (eg cosine transfer function of the MZM) by restricting the amplitude of the input signals to a range where the inevitable distortion frequencies have a magnitude that is small. This typically means that they have a magnitude below the noise level of the optical link. The maximum allowable input signal is that which causes a nonlinear frequency component to have a power equal to the noise level of the optical link, with the minimum input signal being noise level of the system. This defines the range of input, and associated with this is an output range. Expressing the input and output ranges in terms of signal power (rather than amplitude) defines the dynamic range of the system.

Several linearization techniques have been proposed in the prior art. The basis for many of these techniques is to carefully create a non-linearity that offsets the non-linearity of either the MZM or DC. However, for signals greater than approximately 1 gigahertz electrical predistortion does not work and devices with linear electrical-to-optical transfer functions must be employed.

Typical resulting architectures take the form of multiple MZMs or DCs that are cascaded either series or parallel. U.S. Pat. Nos. 5,671,302 and 5,854,862 to Skeie, U.S. Pat. No. 5,359,680 to Riviere cascade MZMs. U.S. Pat. No. 5,031,235 to Raskin, et al employs a pair of MZMs combined with a directional coupler. These approaches in general require the optical or electrical signal to be split with some degree of precision. Electrical splits are bandwidth dependent. Moreover, electrical splits unavoidably result in a reduction of signal power. Additionally, multiple electrical biases are often required for each component MZM or DC. Theoretically the linearity has been shown to be increased with the added complexity with these techniques, however in practice reliable systems have not resulted due to either bias stability and control issues or fabrication tolerances (in the case of multi-electrode DC architectures).

Another approach in the prior art is to use a Y-fed directional coupler (constant coupling), with multiple electrodes. U.S. Pat. No. 5,309,532 to Chang is an example of this, employing a 3-section directional coupler and a single, fixed coupling segment with a single pair of electrodes connected in series with two passive sections that have separate DC biases. U.S. Pat. No. 5,230,028 uses an approach similar to U.S. Pat. No. 5,309,532.

Linearization of a DC modulator using variable coupling has been described [Laliew et al, J. of Lightwave Technology, vol. 18, no. 9, pp. 1244-1249, September 2000], however the coupling function required regions of both positive and negative coupling. Implementing 180 degree phase changes in the coupling function has presented technical challenges. The prior art lacks for a method where positive coupling can be employed without necessitating 180 degree phase changes.

REFERENCES

Patents
U.S. Pat. No. 5,671,302 to Skeie
U.S. Pat. No. 5,854,862 to Skeie
U.S. Pat. No. 5,309,532 to Chang, et al
U.S. Pat. No. 6,101,296 to Tavlykaev, et al
U.S. Pat. No. 6,236,772 to Tavlykaev, et al
U.S. Pat. No. 5,031,235 to Raskin, et al
U.S. Pat. No. 5,955,875 to Twichell, et al U.S. Pat. No. 5,532,867 to Hayes, et al
U.S. Pat. No. 5,359,680 to Riviere
U.S. Pat. No. 5,230,028 to Lin, et al
U.S. Pat. No. 5,168,534 to McBrien, et al
U.S. Pat. No. 5,119,447 to Trisino Other References Laliew, et al, "A Linearized Optical Directional Coupler Modulator at 1.3 μm", Journal of Lightwave Technology, Vol. 18, No. 9, pp 1244-1249, September 2000

OBJECTS AND SUMMARY OF THE INVENTION

It is an object of the present invention to provide an apparatus for the modulation of light signals having a linear modulation output over a wide dynamic range.

It is a further object of the present invention to provide an apparatus for the linear modulation of light signals over a wide dynamic range without resorting to the use of cascaded optical couplers.

It is yet still a further object of the present invention to provide an apparatus for the linear modulation of light signals over a wide dynamic range where the modulation performance is controlled by the fabrication process and not by the accuracy of bias voltages.

An additional object of the present invention is to provide an apparatus for the linear modulation of light signals over a wide dynamic range capable of being embodied in a monolithic structure.

The invention disclosed herein provides an apparatus for linear optical modulation of light carrier signals by an electrical modulation signal. Linearized modulation is achieved through the selection of a spacing profile between two optical transmission waveguides. The spacing profile relates to a transfer function, the parameters of which are chosen to yield linear modulation within a particular dynamic range. A preferred embodiment discloses the invention being fabricated within a monolithic structure.

According to an embodiment of the invention, a linearized directional coupler optical modulator, comprises a first optical transmission path having an input and an output and a second optical transmission path having an input and an output where the first and the second optical transmission paths are substantially coplanar so as to allow the coupling of optical signals therebetween; an electrical signal path, having an electrical input and an electrical output being substantially overlaid on the second optical transmission path so as to facilitate the modulation of an optical signal in the second optical transmission path by an electrical signal in the electrical signal path; and where the distance between the first optical transmission path and the second optical transmission path at any point along the first or second optical transmission paths, is chosen according to a transfer function.

According to an embodiment from which the invention, a linearized directional coupler optical modulator may be fabricated, comprises a first substrate layer; a ground metallization layer, being disposed upon the first substrate layer; a lower cladding layer, being disposed upon the ground metallization layer; a core layer, being disposed upon the lower cladding layer, wherein the core layer further comprises at least two channels capable of supporting the transmission of light therethrough, the at least two channels being in physical proximity of each other so as to allow the coupling of light therebetween; an upper cladding layer, being disposed upon the core layer; and an electrical signal path being disposed upon the upper cladding layer and within proximity of one of the at least two channels so as to cause the modulation of light therein.

According to a feature of the invention, a linearized directional coupler optical modulator, comprises respective indices of refraction of the first optical transmission path and the second optical transmission path at any point along the first or second optical transmission paths, are chosen according to a first transfer function; and wherein the distance between the first optical transmission path and the second optical transmission path at any point along the first or second optical transmission paths, is chosen according to a second transfer function.

DETAILED DESCRIPTION OF THE PREFERRED EMBODIMENT

Figure 1:
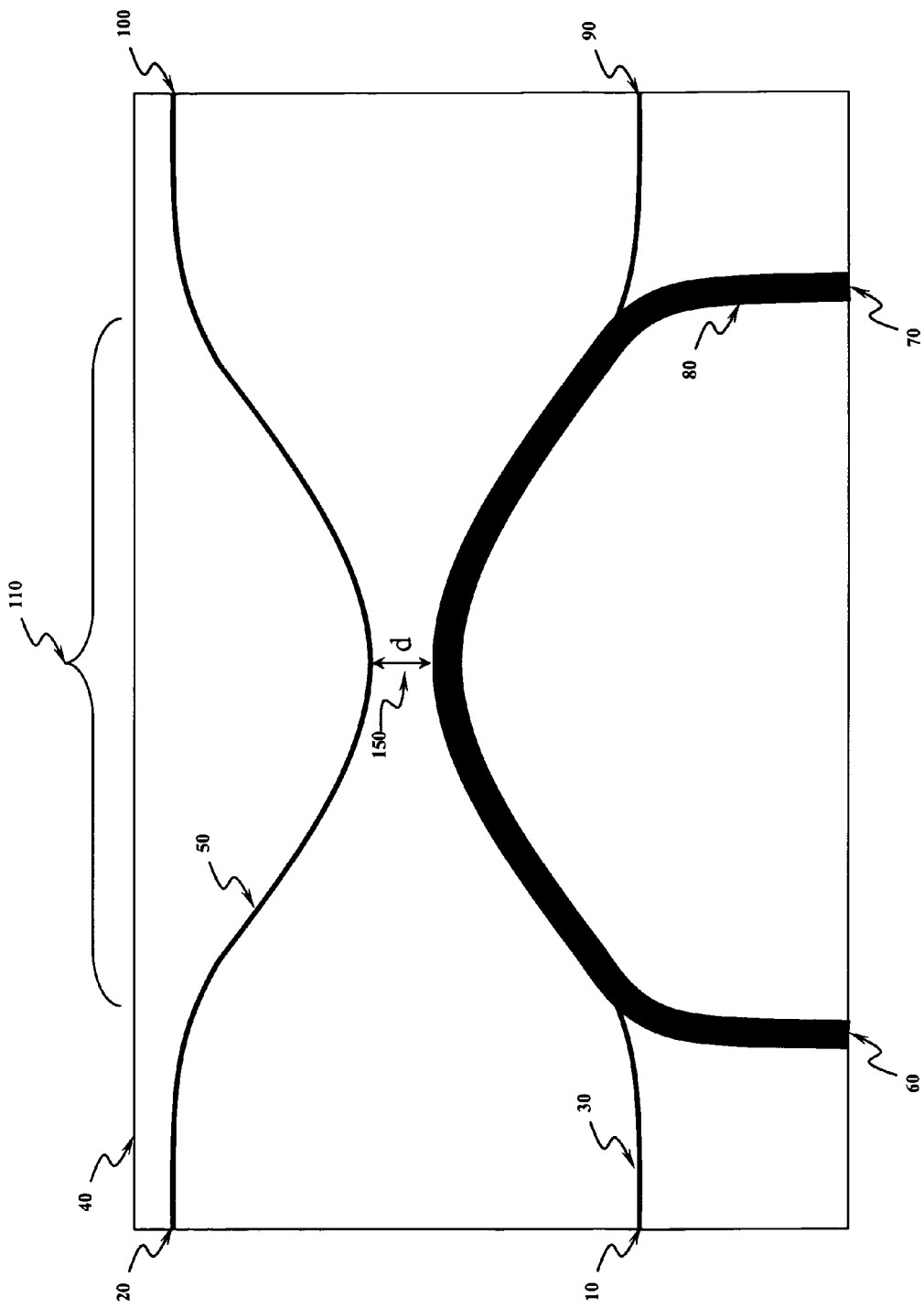
FIG. 1 depicts a top view of the preferred embodiment of the present invention.

Referring to FIG. 1, a preferred embodiment of this invention comprises an optical coupler 110 being fabricated upon a substrate 40. The optical coupler further comprises two optical waveguides 30, 50. The first 30 and second 50 optical waveguides each further comprise a first optical input 10 and second optical input 20 and a first optical output 90 and second optical output 100. Variable coupling between the first 30 and second 50 optical waveguides is achieved through the proximity of said first 30 and second 50 optical waveguides. The degree of optical coupling and the linearity thereof is controlled by a coupling function involving the variable spacing parameter "d" 150 between the first optical waveguide 30 and the second optical waveguide 50, along the length of the optical coupler 110. Some or all of the light is transferred from the first 30 optical waveguide to the second 50 optical waveguide by coupling. An electrode 80, having an input port 60 and a termination port 70, is placed over one of the waveguides 50.

Figure 2:
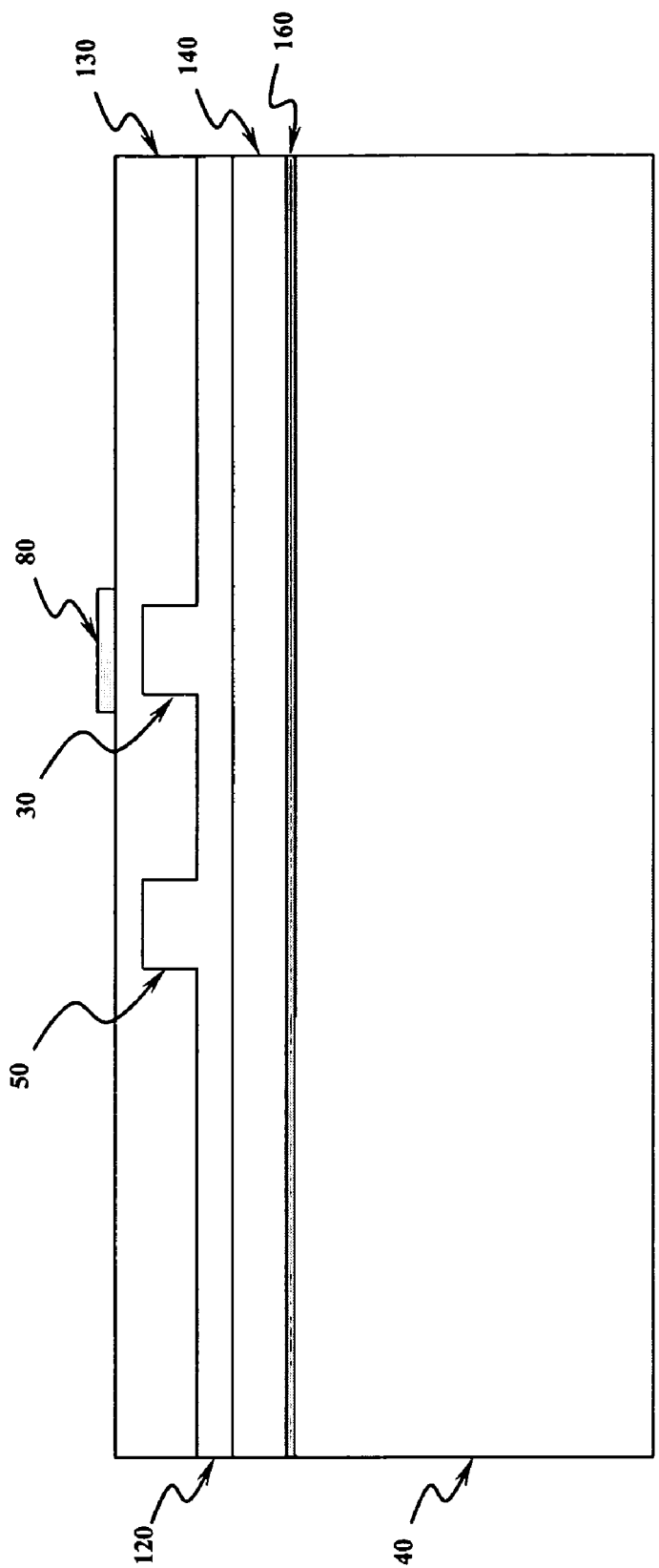
FIG. 2 depicts a cross sectional view of the preferred embodiment of the present invention.

Referring to FIG. 2, a cross-sectional view of the preferred embodiment comprises an electrode 80 fabricated upon a upper cladding 130, with a core layer 120 disposed between said upper cladding and a lower cladding 140. A ground metallization layer 160 is disposed between said lower cladding 140 and said substrate 40.

Referring to both FIG. 1 and FIG. 2, first optical waveguide 30 and second optical waveguide 50 are fabricated with an electro-optic material are brought into close proximity such that evanescent coupling between the two waveguides occurs. Laser light of constant amplitude is input into said first optical input 10. In the preferred embodiment said second optical input 20 is unused. Some or all of the light is transferred through coupling from said first optical waveguide 30 to said second optical waveguide 50. First optical output 90 and second optical output 100 are complimentary outputs, the sum of the optical power from these two outputs is therefore, constant. The amount of light transferred between optical waveguides by coupling is affected by the voltage applied to said electrode 80. Electrode 80 is placed over said second optical waveguide 50 in the preferred embodiment, having an electrical input port 60 and an electrical output port 70. Electrical input signals applied to said electrical input port 60 which cause the amplitude of light emerging from said first and said second optical waveguide output ports 90, 100 to vary in amplitude in accordance with the electrical input signal.

Linearization is achieved through careful control of the coupling function between the two optical waveguides 30, 50. In the preferred embodiment, the coupling function is controlled by varying the separation between the waveguides. The coupling function has been carefully chosen to be linear combination of functions such that a region of the resulting transfer function is linearized. Linearization is characterized where the IM3 and possibly the IM5 and possibly the IM7 terms have been reduced in comparison to a prior art mach-zender modulator. The coupling function is additionally chosen such that no negative coupling is required. The coupling function is a linear sum of functions that have two constraints: the function is positive for all range values, and the fourier transform of the function is also positive for all range values. Two examples are Gauss(x) and Sech($\pi$x).

It should be noted that variable coupling may arise from methods other than the variable spacing parameter "d" 150 between the first optical waveguide 30 and the second optical waveguide 50, such as varying indices of refraction along the length of parallel optical waveguides. Additionally, variable coupling may be achieved by a combination of varying spacing parameter "d" 150 and varying indices of refraction along the length of optical waveguides. In general, any feature of waveguide geometry or material composition that causes a perturbation from the fourier transform relationship will provide variable optical coupling, so long as the coupling function and transform function pair are positive.

The following procedure is used to design the spacing parameter "d" 150 that yields linearization optical coupling: Coupling functions that have no regions of negative coupling are identified, examples are:

$$\kappa_0(z) = a \cdot e^{-\left(\frac{z}{b}\right)^2}$$

and $$\kappa_0(z) = a \cdot sech\left(\frac{z}{b}\right)$$

A sum is formed of the transfer functions that are associated with each of the identified coupling functions. This sum is performed under the constraint that a region of the transfer function has improved linearity over the individual component transfer functions:

$$TF_0(z) = f(\kappa_0(z))$$

$$TF(z) = \sum_i TF_i(z)$$

The coupling functions associated with the transfer functions above, is formed:

$$\kappa(z) = \sum_i f^{-1}(TF_i(z))$$

The waveguide spacing profile is determined from a relationship between the coupling coefficient and waveguide spacing parameter "d" 150, which is specific to the waveguide geometry and materials used and can be empirically derived.

While the preferred embodiments have been described and illustrated, be it known and understood that the present invention is not limited to those precise embodiments described herein, and that various substitutions, equivalents, adaptations and modifications of the invention may be made thereto by those skilled in the art without departing from the spirit and scope of the invention as defined by the appended claims. Accordingly, it is to be understood that the present invention has been described by way of illustration and not limitation.

What is claimed is:

1. A linearized optical modulator, comprising:
   a first optical transmission path having an input and an output;
   a second optical transmission path having an input and an output;
      wherein said first and said second optical transmission paths are substantially coplanar so as to allow the coupling of optical signals therebetween;
   an electrical signal path, having an electrical input and an electrical output being overlaid on said second optical transmission path substantially throughout the region of coupling so as to facilitate the variable modulation of an optical signal in said first optical transmission path and said second optical transmission path by a variable electrical signal in said electrical signal path;
   a plurality of coupling functions between said first and said second optical transmission paths;
   wherein the distance between said first optical transmission path and said second optical transmission path at any point along said first or second optical transmission paths, is chosen according to a transfer function;
   wherein said transfer function is a function of said distance and each of said plurality of coupling functions between said first and said second optical transmission paths;
   wherein each of said plurality of coupling functions correspond, respectively, to each of said any point;
   wherein each of said plurality of coupling functions is positive for all range values; and
   wherein the Fourier transform of each of said plurality of coupling functions is positive for all range values.

2. Linearized optical modulator of claim 1, wherein said optical transmission paths are optical waveguides.

3. Linearized optical modulator of claim 1 wherein said first and second optical transmission paths are fabricated within a substrate of material, said material being capable of supporting the transmission of light therein.

4. Linearized optical modulator of claim 1, wherein said electrical signal path is an electrode.

5. Linearized optical modulator of claim 1, wherein said electrical signal is fabricated as a metallic structure upon said substrate of material.

6. A linearized optical modulator, comprising:
   a first optical transmission path having an input and an output;
   a second optical transmission path having an input and an output;
      wherein said first and said second optical transmission paths are substantially coplanar so as to allow the coupling of optical signals therebetween;
   an electrical signal path, having an electrical input and an electrical output being overlaid on said second optical transmission path substantially throughout the region of coupling so as to facilitate the variable modulation of an optical signal in said first optical transmission path and said second optical transmission path by a variable electrical signal in said electrical signal path;

a plurality of indices of refraction between said first and said second optical transmission paths;

wherein the respective indices of refraction of said first optical transmission path and said second optical transmission path at any point along said first or second optical transmission paths, are chosen according to a transfer function;

wherein said transfer function is a function of said respective indices of refraction and each of said plurality of coupling functions between said first and said second optical transmission paths;

wherein each of said plurality of coupling functions correspond, respectively, to each of said any point;

wherein said coupling function is positive for all range values; and wherein the Fourier transform of said coupling function is positive for all range values.

7. Linearized optical modulator of claim 6 wherein said optical transmission paths are optical waveguides.

8. Linearized optical modulator of claim 6 wherein said electrical signal path is an electrode.

9. Linearized optical modulator of claim 6 wherein said first and second optical transmission paths are fabricated within a substrate of material, said material being capable of supporting the transmission of light therein.

10. Linearized optical modulator of claim 8 wherein said electrical signal path is fabricated as metallic structure upon said substrate of material.

11. A linearized optical modulator, comprising:

a first optical transmission path having an input and an output;

a second optical transmission path having an input and an output;

wherein said first and said second optical transmission paths are substantially coplanar so as to allow the coupling of optical signals therebetween;

an electrical signal path, having an electrical input and an electrical output being overlaid on said second optical transmission path substantially throughout the region of coupling so as to facilitate the variable modulation of an optical signal in said first optical transmission path and said second optical transmission path by a variable electrical signal in said electrical signal path;

a plurality of coupling functions between said first and said second optical transmission paths;

wherein the respective indices of refraction of said first optical transmission path and said second optical transmission path at any point along said first or second optical transmission paths, are chosen according to a transfer function;

wherein the distance between said first optical transmission path and said second optical transmission path at any point along said first or second optical transmission paths, is chosen according to said transfer function;

wherein said transfer function is a function of said respective indices of refraction, said distance, and each of said plurality of coupling functions between said first and said second optical transmission paths;

wherein each of said plurality of coupling functions correspond, respectively, to each of said any point;

wherein said coupling function is positive for all range values; and wherein the Fourier transform of said coupling function is positive for all range values.

12. Linearized optical modulator of claim 11 wherein said optical transmission paths are optical waveguides.

13. Linearized optical modulator of claim 11 wherein said electrical signal path is an electrode.

14. Linearized optical modulator of claim 11 wherein said first and second optical transmission paths are fabricated within a substrate of material, said material being capable of supporting the transmission of light therein.

15. Varaible optical modulator of claim 13 wherein said electrical signal path is fabricated as metallic structure upon said substrate of material.

* * * * *